United States Patent
Sharma et al.

(10) Patent No.: US 10,721,150 B2
(45) Date of Patent: Jul. 21, 2020

(54) SERVER DISCRETE SIDE INFORMATION

(71) Applicant: HEWLETT PACKARD ENTERPRISE DEVELOPMENT LP, Houston, TX (US)

(72) Inventors: Puneet Sharma, Palo Alto, CA (US); Mehdi Malboubi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 217 days.

(21) Appl. No.: 15/571,522

(22) PCT Filed: May 12, 2015

(86) PCT No.: PCT/US2015/030297
§ 371 (c)(1),
(2) Date: Nov. 3, 2017

(87) PCT Pub. No.: WO2016/182560
PCT Pub. Date: Nov. 17, 2016

(65) Prior Publication Data
US 2018/0145893 A1    May 24, 2018

(51) Int. Cl.
*H04L 12/26* (2006.01)
*H04L 12/24* (2006.01)
*G06F 9/455* (2018.01)

(52) U.S. Cl.
CPC ...... *H04L 43/0817* (2013.01); *H04L 41/0213* (2013.01); *H04L 41/142* (2013.01);
(Continued)

(58) Field of Classification Search
CPC ............. H04L 43/0817; H04L 43/0882; H04L 43/0894; H04L 41/142; H04L 43/062; H04L 41/0213; G06F 2009/45591
See application file for complete search history.

(56) References Cited

U.S. PATENT DOCUMENTS 7,054,934 B2 * 5/2006 Graupner ............. G06F 9/5066
  709/221
7,293,086 B1   11/2007 Duffield et al.
(Continued)

FOREIGN PATENT DOCUMENTS

WO    WO-2013181654 A1    12/2013

OTHER PUBLICATIONS

International Search Report and Written Opinion, International Application No. PCT/US2015/030297, dated Feb. 17, 2016, pp. 1-11, KIPO.
(Continued)

*Primary Examiner* — Patrice L Winder
(74) *Attorney, Agent, or Firm* — Hewlett Packard Enterprise Patent Department

(57) ABSTRACT

In some examples, a method can include receiving, at a network monitor, discrete side information from a first server at a first rack regarding a data flow between the first server and a second server at a rack other than the first rack. The discrete side information can, for example, include an indicator determined by the first server that indicates whether the data flow satisfies a reference criteria. The method can further include performing, with the network monitor, a network inference process partly based on the received discrete side information.

14 Claims, 5 Drawing Sheets

(52) U.S. Cl.
CPC ........ *H04L 43/062* (2013.01); *H04L 43/0882* (2013.01); *H04L 43/0894* (2013.01); *G06F 2009/45591* (2013.01)

(56) References Cited

U.S. PATENT DOCUMENTS

| | | | | |
|---|---|---|---|---|
| 7,835,363 | B2* | 11/2010 | Lund | G06F 11/3409 370/230 |
| 8,005,935 | B2* | 8/2011 | Pradhan | H04L 12/66 709/223 |
| 8,102,781 | B2* | 1/2012 | Smith | G06F 9/4856 370/252 |
| 8,160,063 | B2* | 4/2012 | Maltz | H04L 45/02 370/254 |
| 8,195,443 | B2* | 6/2012 | Malloy | H04L 41/145 703/13 |
| 8,489,718 | B1 | 7/2013 | Brar | H04L 49/356 370/254 |
| 8,510,445 | B2* | 8/2013 | Sugauchi | G06F 11/3433 709/220 |
| 8,661,136 | B2* | 2/2014 | Tumbde | H04L 67/1008 709/203 |
| 8,943,499 | B2* | 1/2015 | Turner | H04L 41/12 718/1 |
| 9,026,640 | B2* | 5/2015 | Loboz | G06Q 10/06393 709/224 |
| 9,288,134 | B2* | 3/2016 | Guo | H04L 45/125 |
| 9,307,048 | B2* | 4/2016 | Kandula | H04L 67/325 |
| 9,588,864 | B2* | 3/2017 | Vijaykumar | G06F 11/3062 |
| 9,641,592 | B2* | 5/2017 | Thompson | H04L 67/06 |
| 9,705,798 | B1* | 7/2017 | Abts | H04L 47/122 |
| 10,097,372 | B2* | 10/2018 | Bhattacharya | H04L 45/745 |
| 10,135,735 | B2* | 11/2018 | Yousaf | H04L 47/115 |
| 2004/0158626 | A1 | 8/2004 | Douglas | |
| 2005/0076112 | A1* | 4/2005 | Ravindran | G06F 9/465 709/224 |
| 2005/0169254 | A1* | 8/2005 | Kurita | H04L 45/22 370/352 |
| 2007/0150584 | A1 | 6/2007 | Srinivasan | |
| 2008/0221918 | A1 | 9/2008 | Petersen et al. | |
| 2008/0259800 | A1 | 10/2008 | Clark et al. | |
| 2010/0214920 | A1 | 8/2010 | Tewani et al. | |
| 2012/0102190 | A1* | 4/2012 | Durham | H04L 41/0823 709/224 |
| 2012/0233473 | A1* | 9/2012 | Vasseur | G06F 1/3206 713/300 |
| 2013/0064096 | A1 | 3/2013 | Degioanni et al. | |
| 2013/0159548 | A1 | 6/2013 | Vasseur et al. | |
| 2013/0262661 | A1 | 10/2013 | Malboubi et al. | |
| 2013/0326038 | A1* | 12/2013 | Bodik | G06F 9/4856 709/223 |
| 2014/0078882 | A1 | 3/2014 | Maltz et al. | |
| 2015/0043905 | A1* | 2/2015 | Graves | H04Q 11/0005 398/25 |
| 2015/0052243 | A1 | 2/2015 | Lumezanu et al. | |
| 2015/0081878 | A1* | 3/2015 | Pabba | H04L 41/0806 709/224 |
| 2015/0089046 | A1 | 3/2015 | Waxman et al. | |

OTHER PUBLICATIONS

Matthew Roughan et al., "Spatio-Temporal Compressive Sensing and Internet Traffic Matrices (Extended Version)," Sep. 13, 2012, pp. 1-16.

Mehdi Malboubi et al., "Intelligent SDN Based Traffic (de) Aggregation and Measurement Paradigm (iSTAMP)," Jan. 14, 2014, pp. 1-9, IEEE.

Zhiming Hu et al., "CREATE: CoRrelation Enhanced trAffic maTrix Estimation in Data Center Networks," Mar. 23, 2014, pp. 1-9, Nanyang Technological University, Singapore.

International Preliminary Report on Patentability received for PCT Patent Application No. PCT/US2015/030297, dated Nov. 23, 2017, 10 pages McKeown et al., "OpenFlow: Enabling Innovation in Campus Networks," ACM SIGCOMM Computer Communication Review, vol. 38, No. 2, 2008, pp. 69-74.

Kandula et al., "The Nature of Data Center Traffic: Measurements & Analysis," IMC '09 Proceedings of the 9th ACM SIGCOMM conference on Internet measurement, 2009, pp. 202-208.

Gangam et al., "Pegasus: Precision Hunting for Icebergs and Anomalies in Network Flows", 2013 Proceedings IEEE INFOCOM, 2013, pp. 1-9.

Curtis et al., "Mahout: Low-overhead Datacenter Traffic Management Using End-host-based Elephant Detection," 2011 Proceedings IEEE INFOCOM, 2011, pp. 1629-1637.

Al-Fares et al., "Hedera: Dynamic Flow Scheduling for Data Center Networks," in Proceeding NSDI'10 Proceedings of the 7th USENIX conference on Networked systems design and implementation, 2010, 15 pages.

European Search Report and Search Opinion Received for EP Application No. 15892019.9, dated Oct. 25, 2018, 15 pages.

Partial European Search Report and Search Opinion Received for EP Application No. 15892019.9, dated Aug. 24, 2018, 15 pages.

* cited by examiner

SERVER DISCRETE SIDE INFORMATION

BACKGROUND

Computer data centers can be constructed to house and operate computer systems for purposes such as data processing, cluster computing, telecommunications, storage, etc. Some smaller data centers can occupy a single room of a building, whereas larger data centers can occupy one or more floors of a building and in some cases can occupy an entire building. Electronic equipment within a data center is often mounted in standardized rack cabinets (also known as "racks"). Equipment in different racks of a data center are often designed to communicate with each other via networking cables or other longer distance communication channels. Equipment within the same rack of a data center are often designed to communicate with one another via local data connections or other local communication channels, but are also often coupled via networking cables.

BRIEF DESCRIPTION OF THE DRAWINGS

For a detailed description of various examples, reference will now be made to the accompanying drawings in which.

DETAILED DESCRIPTION

Figure 1:
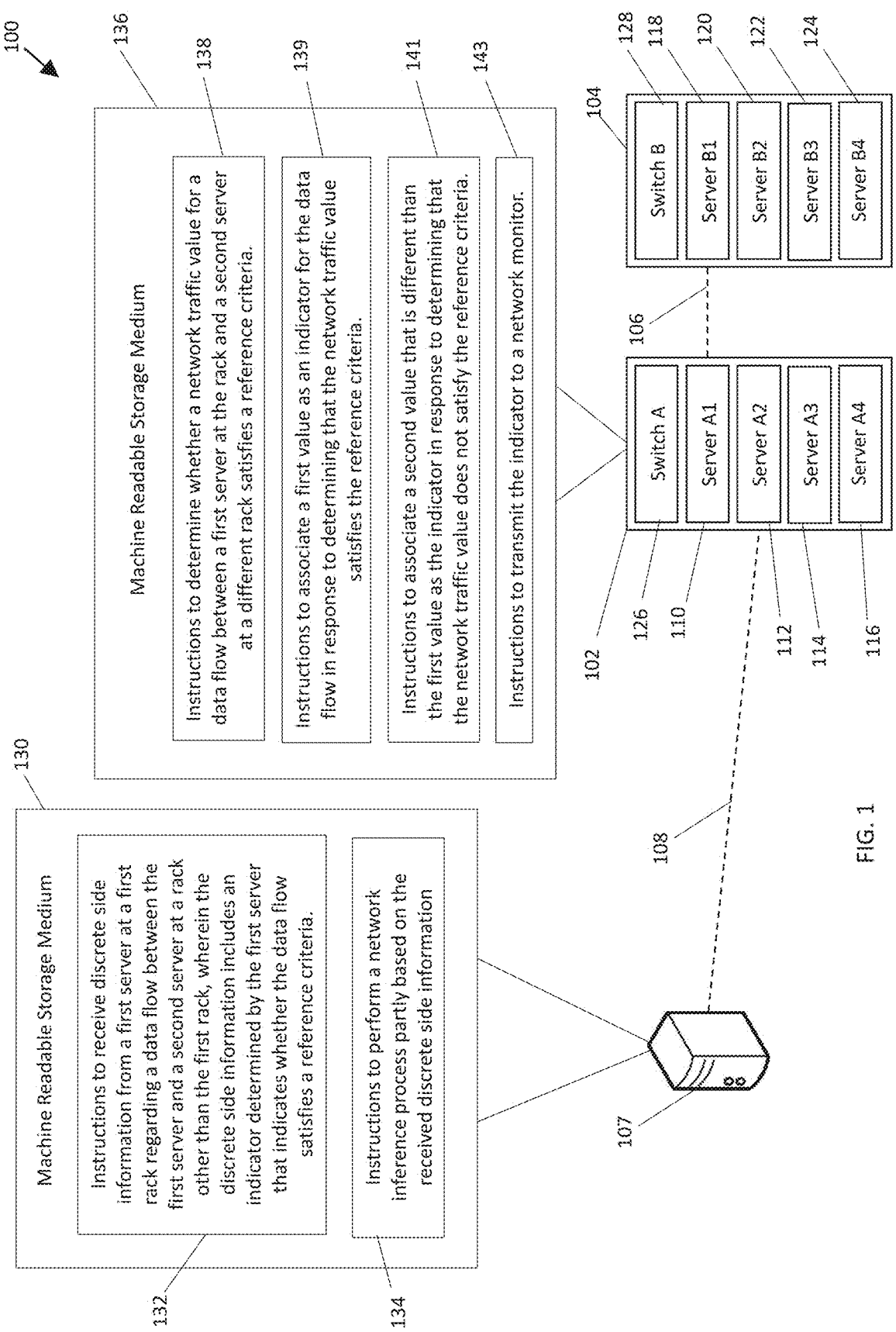
FIG. 1 is a diagram of a data center, according to an example.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on. Also, as used herein, "a plurality of" something can refer to more than one of such things.

Flows between equipment in different racks of a data center can be accurately measured by measurement agents inside the equipment. For example, flows between virtual machines (VMs) in servers located on different racks can be measured by such agents inside each server/VM. One challenge regarding the use of such data monitoring solutions is related to the traffic generated by the agents when reporting the information to a network monitor (such as a network monitoring center server located in the data center)—especially when bandwidth reserved for monitoring traffic is scarce and limited. As described in further detail herein, certain implementations of the present disclosure are directed to solutions that leverage discrete side information from servers or other rack equipment to efficiently compress and report information used to estimate data flows between equipment in a data center. For example, in some implementations, discrete side information is able to provide improved flow estimation accuracy by being paired with link-load measurements (such as those available from Simple Network Management Protocol (SNMP)-capable devices) otherwise reported to the network monitor. It is appreciated that link-load measurements can be provided using different protocols or techniques other than SNMP that are suitable for collecting link load measurements. Similar pairing of discrete side information with other inference information is possible.

In some implementations of the present disclosure and as described further herein, a method can include receiving, at a network monitor, discrete side information from a first server at a first rack regarding a data flow between the first server and a second server at a rack other than the first rack. The discrete side information can, for example, include an indicator determined by the first server that indicates whether the data flow satisfies a reference criteria. In such an implementation, the method can further include performing, with the network monitor, a network inference process partly based on the received discrete side information. Additional details regarding this method are described below at least with respect to the method of FIG. 2 and it is appreciated that other steps or methods can be performed in furtherance of the objectives of the present disclosure or to provide additional or alternative functionality.

Certain implementations of the present disclosure can provide one or more advantages compared to existing techniques for data center network flow monitoring. For example, in some implementations, accurate traffic matrix estimates can be provided with a high compression ratio (e.g., without having to transmit full traffic size indicator to the network monitor), which can for example result in improved monitoring bandwidth efficiency. In addition, in some implementations, accuracy of Heavy Hitter (e.g., large flow) detection can be improved as the status of large flows can be more precisely reported, which can for example be important in network traffic engineering and network security applications. Further, in some implementations, compression ratios for reporting monitoring information can be improved in more static data center environments where flows show more stable behaviors and status bits may not be used to be reported in each time interval. Moreover, certain implementations of the present disclosure can be applied not just to data center networks but to other networks such as Internet Service Provider (ISP) networks where a flow level status can, for example, be obtained by directly measuring all flows during learning periods and/or from learning data. Other advantages of implementations presented herein will be apparent upon review of the description and figures.

FIG. 1 is a diagram of a simplified example data center 100. As provided above, data center 100 can, for example, be provided to house and operate computer systems for purposes such as data processing, cluster computing, telecommunications, storage, etc. In this example, equipment within data center 100 is mounted in racks 102 and 104, with equipment in different racks of data center 100 designed to communicate with each other via communication links 106, which can for example be in the form of networking cables, such as Ethernet or Fibre Channel cables. Equipment within the same rack of data center 100 is designed to communicate with one another via local data connections, such as copper cabling, one or more data bus bars, etc.

Equipment within data center 100 can, for example, be in the form of computing devices mounted within each rack and each rack can include multiple rack mounted equipment, such as servers, switches, storage devices, etc. For illustration, the example data center 100 of FIG. 1 includes two example racks 102 and 104 connected to each other via communication link 106 and connected to a network monitor 107 via another communication link 108. Each rack 102 and 104 includes multiple servers 110, 112, 114, and 116 (for rack 102) and servers 118, 120, 122, and 124 (for rack 104). In some implementations, neither the servers described herein are not housed within racks. For example, in some implementations, server 110 is located in a housing (e.g., a personal computer tower housing) and is in data communication with server 118 (housed, e.g., within another personal computer tower housing) via networking links as opposed to local links. Each rack 102 and 104 further includes respective network switches 126 and 128. Such switches can, for example, be used to provide network connectivity or other functionality for servers and storage devices housed in the same rack. In some implementations, such switches can be in the form of multilayer switches that operate at multiple layers of the OSI model (e.g., the data link and network layers). Although the term "switch" is used throughout this description, it is appreciated that the term "switch" can include other network data path elements in the form of suitable routers, gateways and other devices that provide switch-like functionality. It is appreciated that the exact number of servers, switches, and racks illustrated in FIG. 1 is provided merely as an example and that different configurations of racks, servers, switches, and other equipment can be used in accordance with the present disclosure.

Equipment within each rack can, for example, be in data communication with one another via local data connections, such as data buses, cables, etc. For example, in a top of rack (ToR) design, servers can connect to one or more Ethernet network switches installed inside the rack. Copper or other cabling for servers can, for example, be used within a given rack via RJ45 patch cables (or others types of cables) from the server to the rack switch. The racks themselves can also be in data communication with one another using network cables or other communication channels. For example, each rack can be connected to other racks or computing devices within the data center with Fibre Channel cables, Ethernet cables, or other forms of networking cabling, as well as certain suitable wireless communication channels.

The term "equipment" as used in the present disclosure (e.g., referring to equipment within data center 100) is not intended to be limited to physical equipment, such as physical switches, physical servers, physical storage devices, etc. Instead, the term "equipment" is intended to also refer to suitable virtualized devices. The term "virtual" (and its variants) as used herein can, for example, refer to virtual network links and virtual devices implemented using methods of network virtualization. As but one example, a virtual switch can be implemented in a virtual network, which can allow virtual machines to communicate using the same protocols as physical switches. The virtual switch can, for example, emulate a traditional physical Ethernet network switch by forwarding frames at the data-link layers. Similarly, virtual routers can be implemented that are designed to route packets from one network to another based on decisions taken from routing tables. The functionality of such a virtual router may be similar to that of a physical router but packets can be sent between virtual machines in different networks. Virtual machines can, for example, have virtual Ethernet interfaces, which can be treated similarly to a physical (i.e., non-virtual) Network Interface Card (NIC) for use in a physical (i.e., non-virtual) network. Other forms of equipment, such as servers and storage devices can also be virtualized in accordance with the present disclosure.

Traffic can be forwarded along network data paths, such as communication links 106 and 108 based on metadata within the traffic. Such traffic can, for example, be in the form of a data packet. For illustration, the networking term "packet" is used herein, however, it is appreciated that the term "packet" can refer to any suitable protocol data unit (PDU). The packet can, for example, include payload data as well as metadata in the form of control data. Control data can, for example, provide data to assist the node with reliably delivering the payload data. For example, control data can include network addresses for source and destination nodes, error detection codes, sequencing information, and packet size of the packet.

As described in further detail below, equipment within data center 100 can include suitable software or other types of machine readable instructions to leverage discrete side information from servers in data center 100. For example, and as described in further detail below with respect to the medium of FIG. 5. Network monitor 107 can include a machine readable storage medium 130 including instructions 132 to receive discrete side information from server 110 at rack 102 regarding a data flow between server 110 and server 118 (or another server) at a different rack, such as rack 104. As described in further detail below, the discrete side information can, for example, include an indicator determined by server 110 that indicates whether the data flow satisfies a reference criteria. As described in further detail below, medium 130 can further include instructions 134 to perform, with network monitor 107, a network inference process partly based on the received discrete side information from server 110.

Other equipment in data center 100 can also run software or other types of machine readable instructions to compute and/or leverage discrete side information. For example, one or more equipments housed within rack 104 can include a machine readable storage medium 136 that includes instructions 138 to determine whether a network traffic value for a data flow between server 110 at rack 102 and server 118 at a different rack satisfies a reference criteria, such as for example a threshold value. Medium 136 can further include instructions 139 to associate a first value as an indicator for the data flow in response to determining that the network traffic value satisfies the reference criteria. Medium 136 can further include instructions 141 to associate a second value that is different than the first value as the indicator in response to determining that the network traffic value does not satisfy the reference criteria. Medium 136 can further include instructions 143 to transmit the indicator to a network monitor. Further details regarding the machine readable instructions of equipment and other computing devices of data center 100 is provided below with respect to the method of FIG. 2 and other implementations of the present disclosure described herein.

Figure 2:
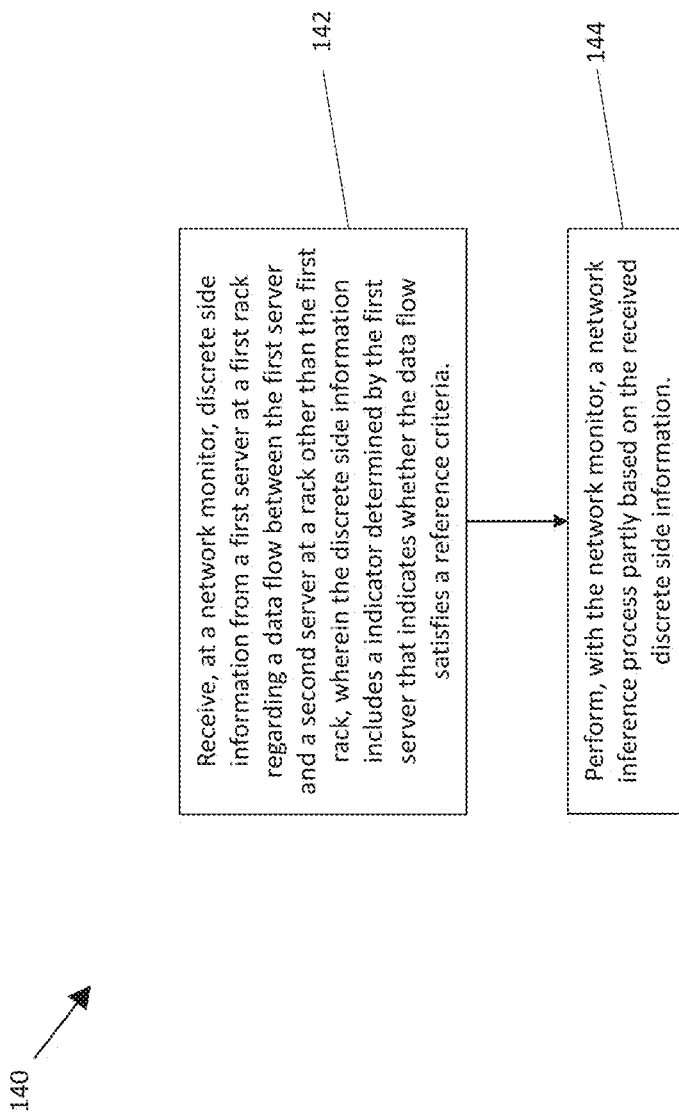
FIG. 2 is a flowchart for a method, according to an example.

FIG. 2 is a flowchart for an example method 140 implemented in network monitor 107. In some implementations, method 140 can be implemented in the form of executable instructions stored on a memory resource (e.g., the memory resource of FIG. 4), executable machine readable instructions stored on a storage medium (e.g., on medium 130 of network monitor FIG. 1), in the form of electronic circuitry (e.g., on an Application-Specific Integrated Circuit (ASIC)), or another suitable form. Although the description of method 140 herein primarily refers to steps performed on network monitor 107 for purposes of illustration, it is appreciated that method 140 can be executed on another computing device within data center 100 or outside of data center 100.

Method 140 includes a step 142 of receiving, at network monitor 107, discrete side information from a first server (e.g., server 110 in this example) at a first rack (e.g., rack 102 in this example) regarding a data flow between server 110 and a second server (e.g., server 118 in this example) at a rack (e.g., rack 104 in this example) other than rack 102. The discrete side information can, for example, include an indicator determined by server 110 that indicates whether the data flow satisfies a reference criteria. It is appreciated that different racks, servers, etc., can be used in accordance with the present disclosure. For example, in some implementations, the first server is server 120 at rack 104 and the second server is server 116 at rack 102.

The reference criteria can, for example, be dynamically determined based on network traffic. In some implementations, the reference criteria can, for example, be a value for link capacity usage between server 110 and server 118 (e.g., 10% usage of link capacity). It is appreciated that other forms of reference criteria can be used, such as for example bandwidth consumed, etc. Moreover, in some implementations, multiple reference criteria may be used, such as for example, a reference value for a first type of monitored value for the network (e.g., link capacity usage) in addition to a reference value for a second type of monitored value for the network (bandwidth usage). In such an implementation, whether the data flow satisfies a reference criteria is determined whether the data flow satisfies both types of values. For example, the reference value for the first type of monitored value can, for example, be link capacity usage of 20% of the link between server 110 and server 118. If a link capacity usage value monitored by server 110 between itself and server 118 is below this value, then this criteria may be considered satisfied. Next the reference value for the second type of monitored value be bandwidth usage of 100 Megabytes over a period of time. If a bandwidth usage value monitored by server 110 between itself and server 118 is below this value, then this criteria may be considered satisfied and the overall criteria may be considered satisfied. The use of simple reference criteria in the form of a comparison operator (i.e., is monitored value greater than reference value) is provided herein for illustration. However, it is appreciated that different types of criteria, including more advanced reference criteria beyond a simple comparison of values can be used if desired.

Once server 110 determines whether the data flow satisfies the reference criteria, server 110 can associate a first value as an indicator for the data flow in response to determining that the network traffic value satisfies the reference criteria and can associate a second value that is different than the first value as the indicator in response to determining that the network traffic value does not satisfy the reference criteria. For example, if server 110 determines that the network traffic value satisfies the reference criteria, server 110 can store a value of 1 for a bit associated with the determination and if server 110 determines that the network traffic value does not satisfy the reference criteria, server 110 can store a value of 0 for a bit associated with the determination. It is appreciated that other indicators and values can be used to store information relating to the discrete side information. In some implementations, multiple bits are used to store discrete side information. For example, a first bit of two bits can store an indicator regarding whether the network traffic satisfies a first reference criteria and a second bit can store an indicator regarding whether the network traffic satisfies a second reference criteria. For example, if there is a single threshold value (e.g., only a single reference criteria), then a measurement agent can compare the flow size with the threshold value and for each flow there is only one bit of information (e.g., 0 or 1). If, however, there are multiple threshold values (e.g., multiple reference criteria), then a measurement agent can compare the flow size with the multiple threshold values and for each flow there can be multiple bits of information. For example if there are four threshold levels (including a zero level), then the side information related to the size of each flow can be encoded with two bits (e.g. 00, 01, 10 or 11). In some implementations, given $k_0$ threshold levels, then the value of each flow-size can, for example, be encoded with $\log_2(k_0)$ bits of information.

Method 140 includes a step 144 of performing, with network monitor 107, a network inference process partly based on the received discrete side information. The term "network inference process" as used herein can, for example, refer to taking incomplete information from equipment within data center 100 and estimating (i.e., inferring) the remaining information. Under-determined linear inverse problems can be used in some inference applications such as a Traffic Matrix (TM) estimation, link-loss estimation, and localization. In these applications the total number of measurements (e.g., unknown quantities) provided to network monitor 107 will be less than the number of unknowns. The TM estimation can, for example, be used to estimate traffic size, which is an amount of network traffic between any pair of two equipments over some time interval. One goal of TM estimation is to infer the size of traffic flows from link load measurements when we have the routing matrix between equipments. One example of a network inference process is the Least-Absolute Shrinkage and Selection Operator (LASSO), however, it is appreciated that any other suitable network inference process may be used.

An example network inference process will now be described for illustration. It is appreciated that alternatives processes may be used for different implementations. First, the network inference problem may be modeled as a constrained TM estimation formulation where at each time interval t, TM vector (X) is estimated from SNMP link-load measurement vector (Y) where routing matrix (H) is considered to be known (which is a reasonable assumption in DCs). It is appreciated that the vector Y is not limited to only SNMP link loads, can be calculated from other types of link load measurements or other suitable measurements. TM estimation is formulated as the following optimization framework (Equation 1 below) where p and q determine the network inference technique and $\lambda$ is a regularization parameter which must be selected, appropriately.

$$\hat{X} = \underset{X}{\text{minimize}} \, \|Y - HX\|_p + \lambda \|X\|_q$$
$$\text{s.t.} \, X \gtreqless \theta$$

Equation 1—TM Estimation Framework

In the above equation, X is an N×1 vector where each component of X represents a flow from a server/VM in a rack to a server/VM in another rack and Y is an m×1 vector where each component of Y represents the load of a link.

Based on the direct per-flow measurements inside the racks, the side information for TM estimation framework is provided in a form of discreet constraints where each flow $x_j$ is compared with a threshold value ($\theta$) (or multiple threshold values), which can, for example be defined by a network administrator or other source based on the application, and its status ($c_j$) for each pair of equipments are reported to network monitor 107 using discrete side information vector (C), thereby constructing discrete threshold based sketches.

$$c_j = \begin{cases} 0 & \text{if } x_j < \theta \\ 1 & \text{if } x_j \geq \theta \end{cases} \text{ for } j \in \{1, \ldots, N\}$$

Discrete Side Information Vector for a Single Threshold Value $\theta$ $$c_j = \begin{cases} 00 & \text{if } 0 \leq x_j \leq \theta_1 \\ 01 & \text{if } \theta_1 \leq x_j \leq \theta_2 \\ 10 & \text{if } \theta_2 \leq x_j \leq \theta_3 \\ 11 & \text{if } x_j \geq \theta_3 \end{cases} \text{ for } j \in \{1, \ldots, N\}$$

Discrete Side Information Vector for Multiple Threshold Values $\theta_1$, $\theta_2$, and $\theta_3$ Discrete side information vector C is equal to [$c_1$, $c_2$, ... $c_N$], which can for example be a simple binary array of values, such as [1, 0, . . . , 0, 1]. Using these constraints (i.e., threshold based values as side information), the TM estimation framework can provide more accurate estimate of the flows between various equipments within data center 100.

By reporting such discrete side information to network monitor 107 where the actual TM estimation is performed based on SNMP link-load measurements from network devices, not only is the estimation accuracy improved, but also a high data compression ratio can be achieved, which can be useful for reducing monitoring data traffic to limit link bandwidth usage in data networks.

The threshold values for use with the TM estimation framework (or other network inference processes) can be determined in multiple ways. For example, in a "supervised method," assuming the existence of a set of learning TMs during specific time intervals, a threshold value can be computed and can be used over other time intervals. The threshold value can, for example also be computed based on the statistical distribution of the TMs. In a heuristic method, the threshold can be based on the application (e.g. in heavy-hitter detection $\theta$ can equal 10% of LinkCapacity). In an adaptive/online/automatic method, the threshold can be adaptively determined by tracking monitoring accuracy and performance (directly or indirectly). It is appreciated that other techniques for determining threshold values may be used. As an example, although certain automatic determination methods are described, in some implementations, a network administrator can manually select a threshold value.

Although the flowchart of FIG. 2 and description of method 140 identifies one order of performance, it is appreciated that this order (as well as the order of other methods described herein) may be rearranged into another suitable order, may be executed concurrently or with partial concurrence, include additional or comparable steps to achieve the same or comparable functionality, or a combination thereof.

Figure 3:
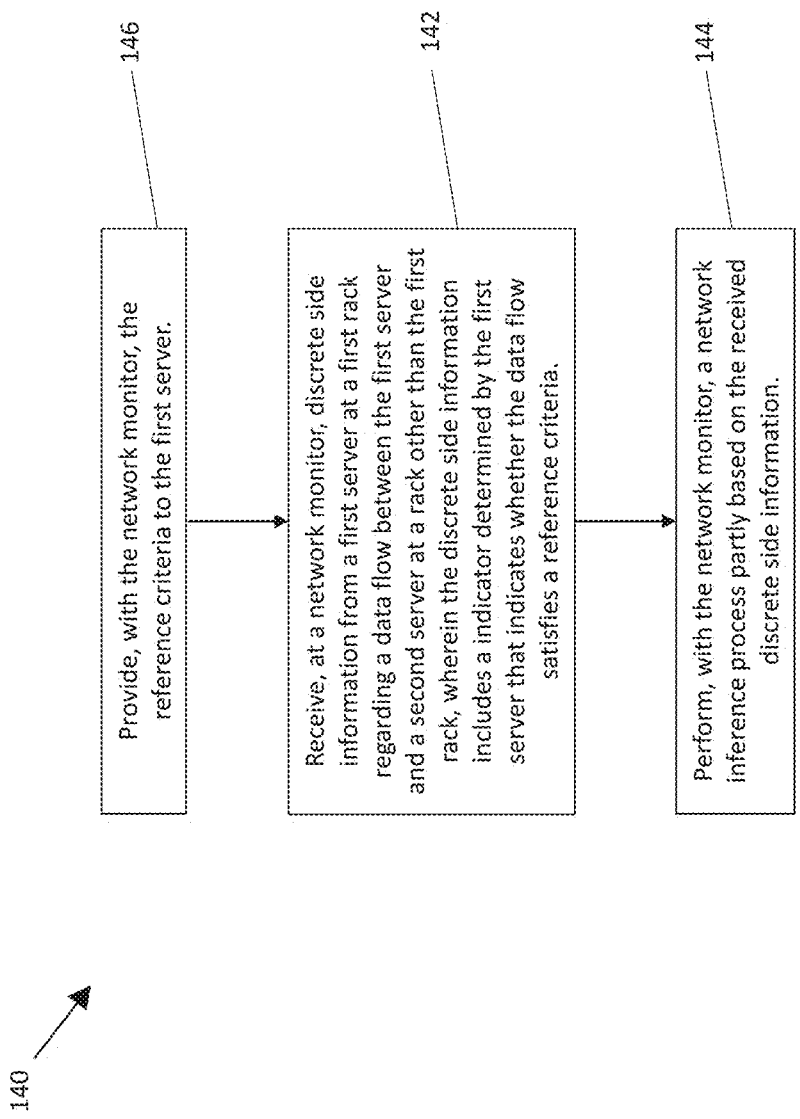
FIG. 3 is a flowchart for a method, according to another example.

FIG. 3 illustrates another example method 140 in accordance with the present disclosure. For illustration, FIG. 3 reproduces steps 142 and 144 from method 140 of FIG. 2, however it is appreciated that method 140 of FIG. 3 can include additional, alternative, or fewer steps, functionality, etc., than method 140 of FIG. 3 and is not intended to be limited by the diagram of FIG. 2 (or vice versa) or the related disclosure thereof. It is further appreciated that method 140 of FIG. 2 can incorporate one or more aspects of method 140 of FIG. 3 and vice versa. For example, in some implementations, method 140 of FIG. 2 can include the additional step described below with respect to method 140 of FIG. 3.

Method 140 of FIG. 3 includes steps 142 and 144 described above with respect to method 140 of FIG. 2. Method 140 of FIG. 3 further expressly illustrates a step 146 of actually providing, with network monitor 107, the reference criteria to server 110. As described above with respect to step 142, the reference criteria may be determined by or provided to network monitor 107 using any number of suitable techniques. Network monitor 107 can provide the reference criteria to server 110 using any suitable data channel, such as network cabling (e.g., Ethernet or Fibre Channel cabling) or in some implementations, wireless channels. As illustrated in the flowchart of FIG. 3, step 146 can be executed before steps 142 and 144. However, in some implementations, step 146 can be executed after steps 142 and 144, between steps 142 and 144, concurrently with one or more steps, or at another suitable time.

Figure 4:
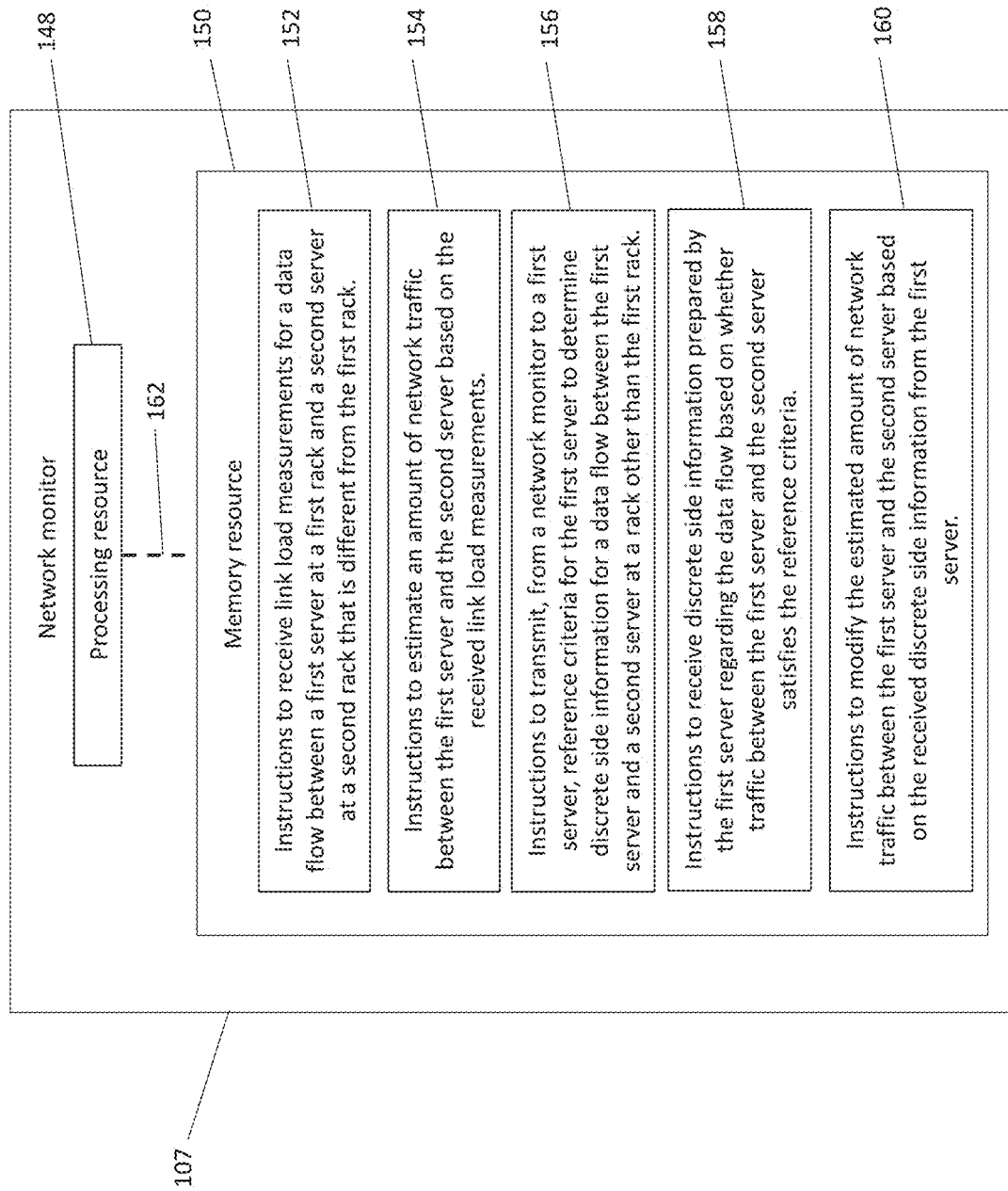
FIG. 4 is a diagram of a network monitor, according to an example.

FIG. 4 illustrates a diagram of a network monitor 107 in accordance with the present disclosure. As described in further detail below, network monitor 107 includes a processing resource 148 and a memory resource 150 that stores machine-readable instructions 152, 154, 156, 158, and 160. The various aspects of network monitor 107 including processing resource 148 and memory resource 150 as well as the various instructions stored on memory resource 150 will be described in further detail below.

Instructions 152 stored on memory resource 150 are, when executed by processing resource 148, to cause processing resource 148 to receive link load measurements for a data flow between a first server 110 and a second server 118. In some implementations, server 110 and server 118 can be located on different racks in a data center or another suitable premises. In some implementations, neither server 110 nor server 118 are housed within racks. For example, in some implementations, server 110 is located in a housing (e.g., a personal computer tower housing) and is in data communication with server 118 (housed, e.g., within another personal computer tower housing) via networking links as opposed to local links. Instructions 152 can incorporate one or more aspects of step 142 of method 140 or another suitable aspect of other implementations described herein (and vice versa). As but one example, in some implementations, instructions 152 can cause processing resource 148 to receive SNMP link load measurements between servers housed in different racks within data center 100.

Instructions 154 stored on memory resource 150 are, when executed by processing resource 148, to cause processing resource 148 to estimate an amount of network traffic between server 110 and server 118 based on the received link load measurements. Instructions 154 can, for example, be designed to implement existing techniques for solving network inference problems, such as the LASSO technique described above with respect to step 144. Instructions 154 can incorporate one or more aspects of step 144 of method 140 or another suitable aspect of other implementations described herein (and vice versa). As but one example, in some implementations, instructions 154 can cause processing resource 148 to create a TM estimation based on the received link load measurements.

Instructions 156 stored on memory resource 150 are, when executed by processing resource 148, to cause processing resource 148 to transmit, from network monitor 107 to server 110, reference criteria for server 110 to determine discrete side information for a data flow between server 110 and server 118. Instructions 156 can incorporate one or more aspects of step 146 of method 140 or another suitable aspect of other implementations described herein (and vice versa). As but one example, in some implementations, instructions 156 can cause processing resource 148 of network monitor 107 to identify one or more types of monitoring data for which server 110 is to determine discrete side information.

Instructions 158 stored on memory resource 150 are, when executed by processing resource 148, to cause processing resource 148 to receive discrete side information prepared by server 110 regarding the data flow based on whether traffic between server 110 and server 118 satisfies the reference criteria. Instructions 158 can incorporate one or more aspects of step 142 of method 140 or another suitable aspect of other implementations described herein (and vice versa). As but one example, in some implementations, instructions 158 can cause processing resource 148 to receive discrete side information in the form of an array of bit values corresponding to data flows between server 110 and various other servers located on different racks within data center 100.

Instructions 160 stored on memory resource 150 are, when executed by processing resource 148, to cause processing resource 148 to modify the estimation for the amount of network traffic between the first server and the second server based on the received discrete side information from the first server. Instructions 160 can incorporate one or more aspects of step 144 of method 140 or another suitable aspect of other implementations described herein (and vice versa). As but one example, in some implementations, instructions 160 can cause processing resource 148 to adjust previously estimated data flow values based on the array of bit values corresponding to data flows between server 110 and other servers within data center 100.

Processing resource 148 of network monitor 107 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 150, or suitable combinations thereof. Processing resource 148 can, for example, include single or multiple cores on a chip, multiple cores across multiple chips, multiple cores across multiple devices, or suitable combinations thereof. Processing resource 148 can be functional to fetch, decode, and execute instructions as described herein. As an alternative or in addition to retrieving and executing instructions, processing resource 148 can, for example, include at least one integrated circuit (IC), other control logic, other electronic circuits, or suitable combination thereof that include a number of electronic components for performing the functionality of instructions stored on memory resource 150. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 148 can, for example, be implemented across multiple processing units and instructions may be implemented by different processing units in different areas of network monitor 107.

Memory resource 150 of network monitor 107 can, for example, be in the form of a non-transitory machine-readable storage medium, such as a suitable electronic, magnetic, optical, or other physical storage apparatus to contain or store information such as machine-readable instructions 152, 154, 156, 158, and 160. Such instructions can be operative to perform one or more functions described herein, such as those described herein with respect to the method of FIGS. 2-3 or other methods described herein. Memory resource 150 can, for example, be housed within the same housing as processing resource 148 for network monitor 107, such as within a computing tower case for network monitor 107. In some implementations, memory resource 150 and processing resource 148 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 150 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 150 can be in communication with processing resource 148 via a communication link 162. Communication link 162 can be local or remote to a machine (e.g., a computing device) associated with processing resource 148. Examples of a local communication link 162 can include an electronic bus internal to a machine (e.g., a computing device) where memory resource 150 is one of volatile, non-volatile, fixed, and/or removable storage medium in communication with processing resource 148 via the electronic bus.

In some implementations, one or more aspects of network monitor 107 can be in the form of functional modules that can, for example, be operative to execute one or more processes of instructions 152, 154, 156, 158, or 160 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of a network monitor 107 can, for example, include one or more machine-readable storage mediums and one or more computer processors.

In view of the above, it is appreciated that the various instructions of network monitor 107 described above can correspond to separate and/or combined functional modules.

For example, instructions 152 can correspond to a "load measurement receiving module" to receive link load measurements for a data flow between a first server at a first rack and a second server at a second rack that is different from the first rack, instructions 154 can correspond to an "estimation module" to estimate an amount of network traffic between the first server and the second server based on the received link load measurements, instructions 156 can correspond to a "transmission module" to transmit, from a network monitor to a first server, reference criteria for the first server to determine discrete side information for a data flow between the first server and a second server at a rack other than the first rack, instructions 158 can correspond to a "discrete side information receiving module" to receive discrete side information prepared by the first server regarding the data flow based on whether traffic between the first server and the second server satisfies the reference criteria, and instructions 160 can correspond to a "estimation modification module" to modify the estimation for the amount of network traffic between the first server and the second server based on the received discrete side information from the first server. It is further appreciated that a given module can be used for multiple functions. As but one example, in some implementations, a single module can be used to both estimate an amount of network traffic between the first server and the second server based on the received link load measurements (corresponding to the functionality of instructions of 154) as well as to modify the estimation for the amount of network traffic between the first server and the second server based on the received discrete side information from the first server (corresponding to the functionality of instructions 160).

Figure 5:
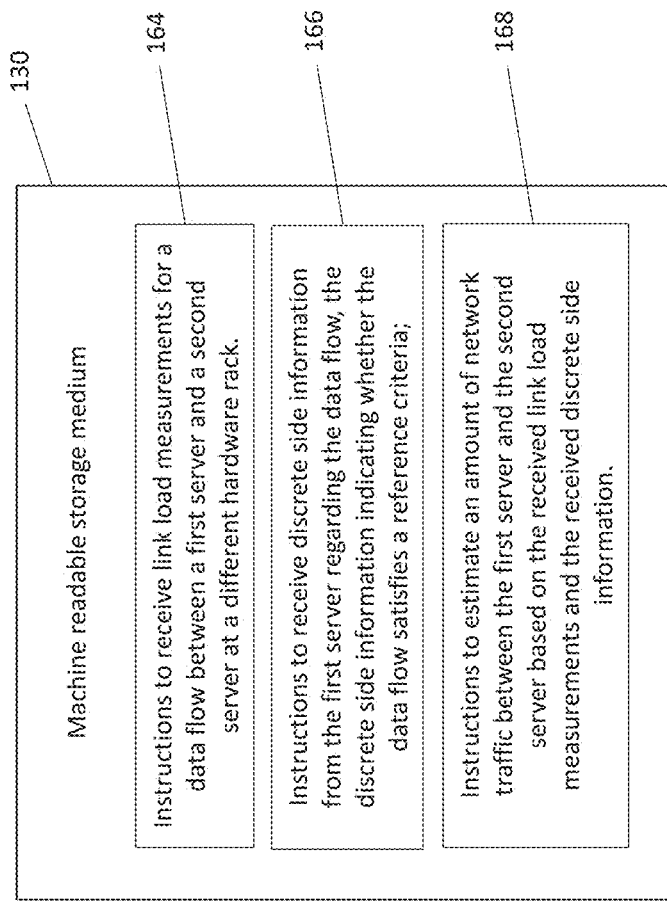
FIG. 5 is a diagram of a machine-readable storage medium, according to an example.

FIG. 5 illustrates a machine-readable storage medium 130 including various instructions that can be executed by a computer processor or other processing resource. In some implementations, medium 130 can be housed within a network monitor, such as a network monitor 107, or on another computing device within data center 100 or in local or remote wired or wireless data communication with data center 100.

For illustration, the description of machine-readable storage medium 130 provided herein makes reference to various aspects of network monitor 107 (e.g., processing resource 148) and other implementations of the disclosure (e.g., method 140). Although one or more aspects of network monitor 107 (as well as instructions such as instructions 152, 154, 156, 158, and 160) can be applied or otherwise incorporated with medium 130, it is appreciated that in some implementations, medium 130 may be stored or housed separately from such a system. For example, in some implementations, medium 130 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 130 includes machine-readable instructions 164 stored thereon to cause processing resource 148 to receive link load measurements for a data flow between a first server and a second server at a different rack. Instructions 164 can, for example, incorporate one or more aspects of steps 142 of method 140 or instructions 152 of network monitor 107 or another suitable aspect of other implementations described herein (and vice versa).

Medium 130 includes machine-readable instructions 166 stored thereon to cause processing resource 148 to receive discrete side information from the first server regarding the data flow, the discrete side information indicating whether the data flow satisfies a reference criteria. Instructions 166 can, for example, incorporate one or more aspects of steps 142 of method 140 or instructions 158 of network monitor 107 or another suitable aspect of other implementations described herein (and vice versa).

Medium 130 includes machine-readable instructions 168 stored thereon to cause processing resource 148 to estimate an amount of network traffic between the first server and the second server based on the received link load measurements and the received discrete side information. Instructions 168 can, for example, incorporate one or more aspects of steps 144 of method 140 or instructions 160 of network monitor 107 or another suitable aspect of other implementations described herein (and vice versa).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A method comprising:
   transmitting, by a network monitor to a first server at a first rack, reference criteria which causes the first server to determine discrete side information for a data flow between the first server and a second server at a second rack other than the first rack, wherein the reference criteria is dynamically determined based on network traffic;
   receiving, by the network monitor from the first server, the discrete side information determined by the first server regarding the data flow between the first server and the second server at the second rack other than the first rack, wherein the discrete side information includes an indicator determined by the first server that indicates whether the data flow satisfies the reference criteria; and
   performing, with the network monitor, a network inference process partly based on the received discrete side information.

2. The method of claim 1, wherein the network inference process is also partly based on Simple Network Management Protocol (SNMP) link-load measurements.

3. The method of claim 1, further comprising:
   providing, with the network monitor, the reference criteria to the first server.

4. The method of claim 1, wherein the reference criteria is a value for link capacity usage between the first server and the second server.

5. The method of claim 1, wherein the discrete side information includes multiple indicators determined by the first server that indicate whether respective data flows between the first server and a plurality of other servers at racks other than the first rack satisfy the reference criteria.

6. The method of claim 1, wherein the discrete side information includes multiple indicators determined by the first server that indicate whether the data flow satisfies multiple reference criteria.

7. The method of claim 6, wherein a first reference criteria of the multiple reference criteria is a first type of monitored value for the network and a second reference criteria of the multiple reference criteria is a second type of monitored value for the network.

8. The method of claim 7, wherein the first type of monitored value is a bandwidth value between the first server and the second server and the second type of monitored value is a link capacity value between the first server and the second server.

9. The method of claim 1, wherein the received link load measurements are Simple Network Management Protocol (SNMP) link-load measurements between the first server and the second server.

10. A non-transitory machine readable storage medium having stored thereon machine readable instructions to cause a computer processor to:
receive link load measurements for a data flow between a first server at a first rack and a second server at a second rack which is a hardware rack other than the first rack;
transmit, by a network monitor to the first server at the first rack, reference criteria which causes the first server to determine discrete side information for a data flow between the first server and a second server at the second rack, wherein the reference criteria is dynamically determined based on network traffic;
receive discrete side information from the first server regarding the data flow, the discrete side information indicating whether the data flow satisfies a reference criteria; and
estimate an amount of network traffic between the first server and the second server based on the received link load measurements and the received discrete side information.

11. The medium of claim 10, wherein the medium is stored on a network monitor connected to the first server via a network connection.

12. The medium of claim 10, wherein estimating an amount of network traffic between the first server and the second server includes performing, with the network monitor, a network inference process partly based on the received discrete side information.

13. A network monitor comprising:
a processing resource; and
a memory resource storing machine readable instructions to cause the processing resource to:
receive link load measurements for a data flow between a first server at a first rack and a second server at a second rack other than the first rack;
estimate an amount of network traffic between the first server and the second server based on the received link load measurements;
transmit, from a network monitor to the first server, reference criteria for the first server to determine discrete side information for a data flow between the first server at the first rack and the second server at the second rack;
receive discrete side information prepared by the first server regarding the data flow based on whether traffic between the first server and the second server satisfies the reference criteria, wherein the reference criteria is dynamically determined based on network traffic; and
modify the estimation for the amount of network traffic between the first server and the second server based on the received discrete side information from the first server.

14. The network monitor of claim 13, wherein the estimated amount of network traffic between the first server and the second server is in the form of a traffic matrix.

\* \* \* \* \*